US006792195B2

(12) United States Patent
    Barton

(10) Patent No.: US 6,792,195 B2
(45) Date of Patent: Sep. 14, 2004

(54) METHOD AND APPARATUS IMPLEMENTING RANDOM ACCESS AND TIME-BASED FUNCTIONS ON A CONTINUOUS STREAM OF FORMATTED DIGITAL DATA

(75) Inventor: James M. Barton, Los Gatos, CA (US)

(73) Assignee: Tivo, Inc., Alviso, CA (US)

( * ) Notice: Subject to any disclaimer, the term of this patent is extended or adjusted under 35 U.S.C. 154(b) by 89 days.

(21) Appl. No.: 09/994,265

(22) Filed: Nov. 26, 2001

(65) Prior Publication Data

US 2002/0034374 A1 Mar. 21, 2002

Related U.S. Application Data

(63) Continuation of application No. 09/054,604, filed on Apr. 3, 1998, now Pat. No. 6,327,418.
(60) Provisional application No. 60/061,693, filed on Oct. 10, 1997.

(51) Int. Cl.[7] .............................. H04N 5/91; H04N 5/85
(52) U.S. Cl. ........................... 386/46; 386/125; 386/68
(58) Field of Search .......................... 386/46, 125, 126, 386/124, 45, 1, 109, 111, 112, 27, 33, 6, 52, 64, 68, 70; H04N 5/91, 5/85

(56) References Cited

U.S. PATENT DOCUMENTS 5,502,573 A  *  3/1996  Fujinami
6,115,536 A  *  9/2000  Iwasaki et al.

* cited by examiner

Primary Examiner—Robert Chevalier
(74) Attorney, Agent, or Firm—Kirk D. Wong; Hickman Palermo Truong & Becker LLP

(57) ABSTRACT

A continuous stream of formatted digital data, such as a video segment, audio segment, or information stream, appears to be a fixed length segment under certain circumstances, defining a virtual segment within the continuous stream which moves forward in time in synchrony with the continuous stream. The virtual segment thus defined can be explored in a non-linear fashion at arbitrary playback rates. For instance, concepts such as rewind, pause, frame advance, and fast forward become meaningful even though the continuous stream never ceases.

141 Claims, 3 Drawing Sheets

METHOD AND APPARATUS IMPLEMENTING RANDOM ACCESS AND TIME-BASED FUNCTIONS ON A CONTINUOUS STREAM OF FORMATTED DIGITAL DATA

This application is a continuation of Ser. No. 09/054,604 filed Apr. 3, 1998 now U.S. Pat. No. 6,327,418, which claims benefit of 60/061,693 filed Oct. 10, 1997.

BACKGROUND OF THE INVENTION

1. Technical Field

The invention relates to digital signal processing. More particularly, the invention relates to a family of methods which provide for the pass through or capture of linear streams of digital information represented in various formats.

2. Description of the Prior Art

With the advent of consumer audio and video products that employ sophisticated digital signal processing techniques it is becoming necessary to find ways to exploit the full potential of digital technology. For example, it would be desirable to provide methods for the pass through or capture of linear streams of digital information represented in various formats, while at the same time providing the appearance to the consumer of a locally stored digital stream that allows for the repositioning and playback of virtual segments of the apparently local digital stream.

A mechanical device which performs some of these functions is the Video Cassette Recorder (VCR), which uses a magnetic tape to store the information. The inherently linear nature of tape leads to functions such as rewind, fast forward, and pause. However, a VCR cannot both capture and play back information at the same time, so it cannot be used to implement this capability.

Linear streams of information are a fixture of modern life. Consider broadcast radio stations, broadcast television stations, satellite broadcasts, cable television, video tapes, and compact disks. Increasingly, such information is represented in a fashion suitable for manipulation by automated electronic hardware, such as computers or media decoders. For example, the Direct Video Broadcast (DVB) standards address digital broadcasting from satellites, terrestrial stations, and cable television systems. Even analog broadcasts, such as normal NTSC (National Television Standards Committee) broadcasts from familiar local stations, may be captured and digitized in real time by modern equipment, making them appear to be linear digital streams.

Though such streams never terminate, and an individual viewer of the stream is unable to effect directly how such streams are delivered, it is desirable to provide the illusion for the consumer that recent portions of the stream are stored locally in some manner, such that typical VCR-like functions can be performed on the stream, e.g. pause, rewind, and fast forward. The desire for this capability arises from the fact that the schedule and timing of the broadcast almost never matches the needs of the individual viewer. For instance, the viewer may wish to stop the stream for a few moments to discipline an unruly child. Or perhaps the viewer's attention was distracted from the stream for a few moments, causing him to miss a critical scene, in which case the viewer would like to rewind to the point he missed and play it again.

Ideally, a device local to the viewer should capture the entire stream as it is being broadcast and store it in some manner. For example, if two video tape recorders are available, it might be possible to Ping-Pong between the two. In this case, the first recorder is started at the beginning of the program of interest. If the viewer wishes to rewind the broadcast, the second recorder begins recording, while the first recorder is halted, rewound to the appropriate place, and playback initiated. However, at least a third video tape recorder is required if the viewer wishes to fast forward to some point in time after the initial rewind was requested. In this case, the third recorder starts recording the broadcast stream while the second is halted and rewound to the appropriate position. Continuing this exercise, one can quickly see that the equipment becomes unwieldy, unreliable, expensive, and hard to operate, while never supporting all desired functions. In addition, tapes are of finite length, and may potentially end at inconvenient times, drastically lowering the value of the solution.

It is possible to implement this capability using a digital computer, where digital streams are stored in some fashion analogous to video tape and where the computer performs the switching between the various virtual tape decks. Even using a digital computer, this strategy suffers from the same weaknesses as the physical system above. It would be desirable to avoid these issues by providing a technique for storing the streams of information on a temporary basis.

When using a digital computer to perform any technique which achieves this functionality, there are a number of issues which must be taken into account for proper operation. The first of these is storage of the broadcast stream. Within a digital computer, a stream of information is represented as a sequence of blocks of digital data. For example, when encoding an NTSC television broadcast stream, each field of analog data is converted to a block of 8-bit digital samples representing the field. If the analog signal is faithfully represented, each digital block contains approximately 0.5 MB of data, one second of video requires approximately 30 MB of storage, and 30 seconds of video requires approximately 900 MB of storage, greater than the capacity of a compact disc. Manipulation of video in this form clearly becomes unworkable when any useful length of stored video is contemplated.

As an example, consider U.S. Pat. No. 5,625,46, which concerns the use of a magneto-optic disk for the storage of broadcast television transmissions. The amount of storage available on such media is currently about 5 to 10 gigabytes, which is sufficient for approximately 5 seconds of video storage—clearly insufficient. In addition, the device disclosed does not permit the simultaneous recording and playback of the same program.

Limited storage capacity is dealt with by compressing the video stream using an algorithm, typically one of the MPEG (Moving Pictures Experts Group) standard algorithms, which can achieve a useful compression of 100:1 in many instances. MPEG video is represented as a sequence of Groups Of Pictures (GOPS), in which each GOP begins with an index frame, called the I-frame. The I-frame is a block of digital data which is compressed using Discrete Cosine Transform (DCT) and other techniques, similar to the still-picture Joint Photographic Experts Group (JPEG) standard.

The GOP may represent up to 15 additional frames by providing a much smaller block of digital data that indicates how small portions of the I-frame, referred to as macroblocks, move over time. Thus, MPEG achieves it's compression by assuming that only small portions of an image change over time, making the representation of these additional frames extremely compact.

Unlike the uncompressed data example above, or examples based on video tape recording, each frame is thus represented as a variable length block of binary data. Additionally, although GOPs have no relationship between themselves, the frames within a GOP have a specific relationship which builds off the initial I-frame. Thus, any method which stores a digitized stream and allows random access to the stored information must take into account the variable (and unpredictable) data sizes involved, as well as be cognizant of the relationships between blocks of the stream.

A second issue for a digital computer based implementation of such methods is that multiple streams of information must be handled in parallel. For example, a broadcast stream is actually composed of at least two unique sequences of information, i.e. a stream of digital blocks representing the visual image and a stream of digital blocks representing the audible image. If the audio effect is instead stereo, then two audio streams are included, each unique. A broadcast signal may have additional data, such as the Secondary Audio Program (SAP), where the stream of information is a translation of the audio signal to a different language. Another stream which may be present is the Closed Caption (CC) stream, which provides a textual representation of spoken language in the audio stream(s). The simple broadcast stream described earlier may therefore have at least five different components, each one compressed using different techniques. When presenting this complex stream to a viewer, the blocks of each stream must be decoded at appropriate times for the compression methods involved and synchronized with the presentation of all other streams.

Also of interest are digital broadcasting technologies, such as DVB. A DVB channel is formed in an MPEG2 Transport Multiplex, which is an encoding scheme that provides for interleaving any number of discrete streams of digital information into a single stream of digital data, using techniques based on Time Division Multiplexing (TDM). The example television signal above can be encoded into a DVB channel using five discrete streams, leaving additional capacity for other streams.

There is increasing interest in adding additional information streams to a standard broadcast signal. For instance, it may be desirable to transmit audio channels in several different languages in parallel with the video stream. Or, perhaps information that is interpreted as a Web page is broadcast in such a way as to be synchronized with the video to provide a multimedia presentation. The number of streams which must be synchronized may be arbitrary, and each stream may be represented using different and unique storage and compression techniques which have their own synchronization requirements and inter-frame relationships.

Any methods which provide functionality similar to that described above using some form of digital computer must contain techniques which resolve these issues.

SUMMARY OF THE INVENTION

The methods and apparatus described herein implement a novel and unique facility that provides for the manipulation of a continuous stream of digital information as if it supported random access and variable rate presentation on demand by the consumer of the stream. The possible operations on the data stream are limited only by the storage capacity and IO bandwidth of the system which implements the apparatus and methods, whether that storage be volatile, such as DRAM, or non-volatile, such as hard disk storage, or a combination of both. The apparatus and methods support operations, sometimes referred to as virtual VCR functions, such as pause, rewind, fast forward, and play, as well as more sophisticated and unique operations, such as play faster, play slower, and play in reverse. Additionally, the apparatus and methods described herein provide a mechanism whereby such operations are instantaneous from the point of view of the consumer of the data stream, unlike in mechanical systems. The apparatus and methods also support the ability to capture portions of the data stream which are temporarily held by the apparatus, such that this captured data can be stored or sent over a network in formats suitable for presenting the data to other consumers, or for editing and manipulation by other tools or methods.

The invention provides a method and apparatus for providing pass through or capture of continuous linear streams of digital information represented in various formats while providing the appearance of a locally stored stream. The preferred embodiment of the invention comprises at least one media cache for copying blocks of data from the information stream. Data in the media cache can be viewed as a snapshot of the continuous stream of digital information. The invention also comprises a playback pointer. The playback pointer position selects a portion of the media cache that is to be accessed to provide functions including any of pause, rewind, fast forward, play, play faster, play slower, and play in reverse.

DETAILED DESCRIPTION OF THE INVENTION

The invention contemplates a new and unique apparatus for transforming and manipulating continuous streams of digital information using the methods and techniques described herein.

Figure 1:
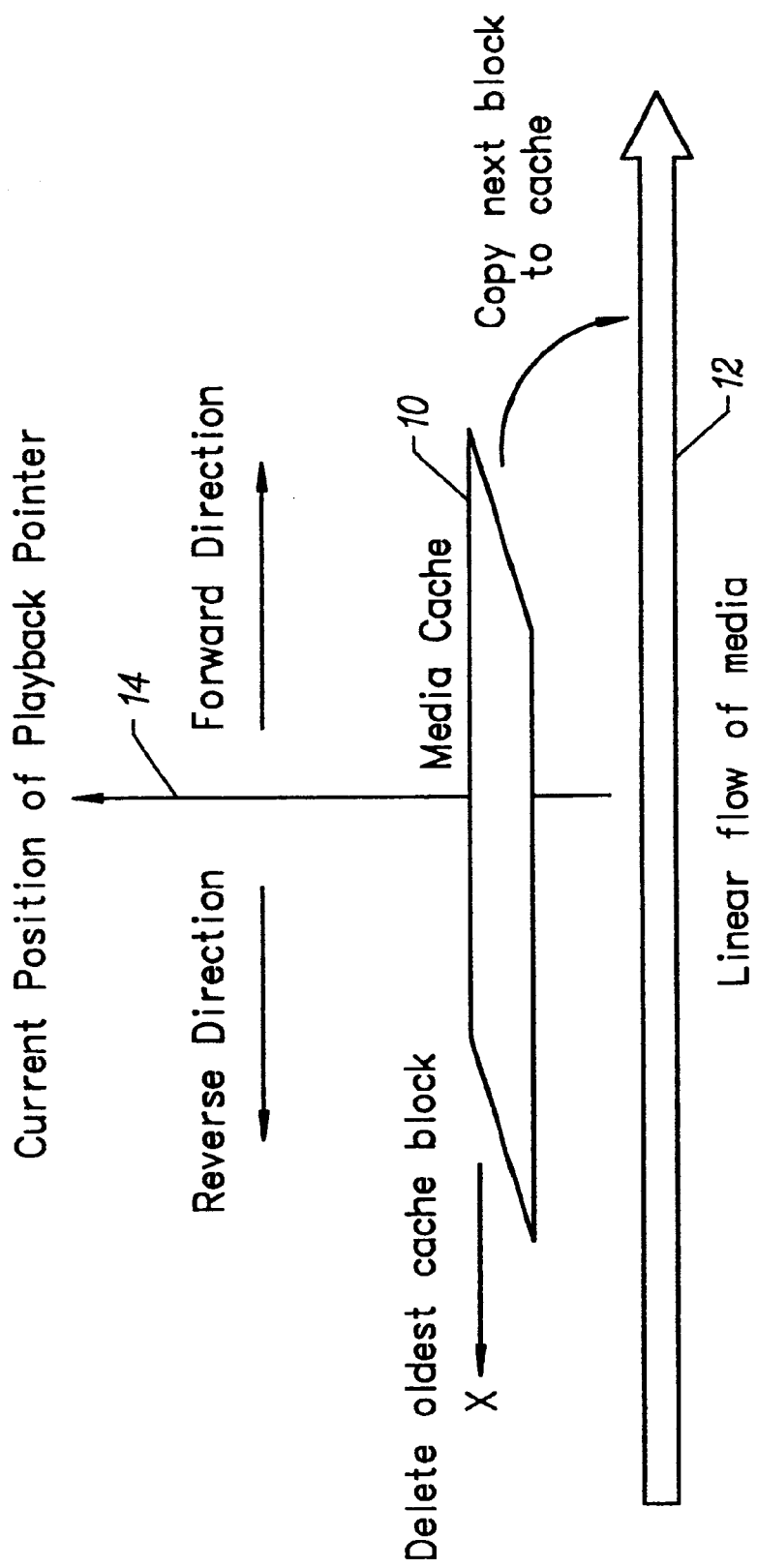
FIG. 1 is a schematic representation of a continuous media buffer according to the invention.

FIG. 1 provides a general overview of how the preferred embodiment of the invention operates on a continuous stream of data. In particular, one or more media caches 10 copy blocks of data from an information stream 12. The position of a playback pointer 14 selects a portion of the media cache that is to be accessed, thus allowing such functions as pause, rewind, fast forward, and play, as well as more sophisticated and unique operations, such as play faster, play slower, and play in reverse.

The apparatus is independent of the format of the underlying digital data stream. To apply the invention, it is only necessary that the underlying data stream is composed of a number of discrete blocks of data, and that only a small set of attributes are associated with each block. The data blocks themselves may be of arbitrary size and format. It is assumed that processes specialized to a data source or to a decoding operation may proceed freely within the context of the invention, indirectly controlled by the methods described herein.

Figure 2:
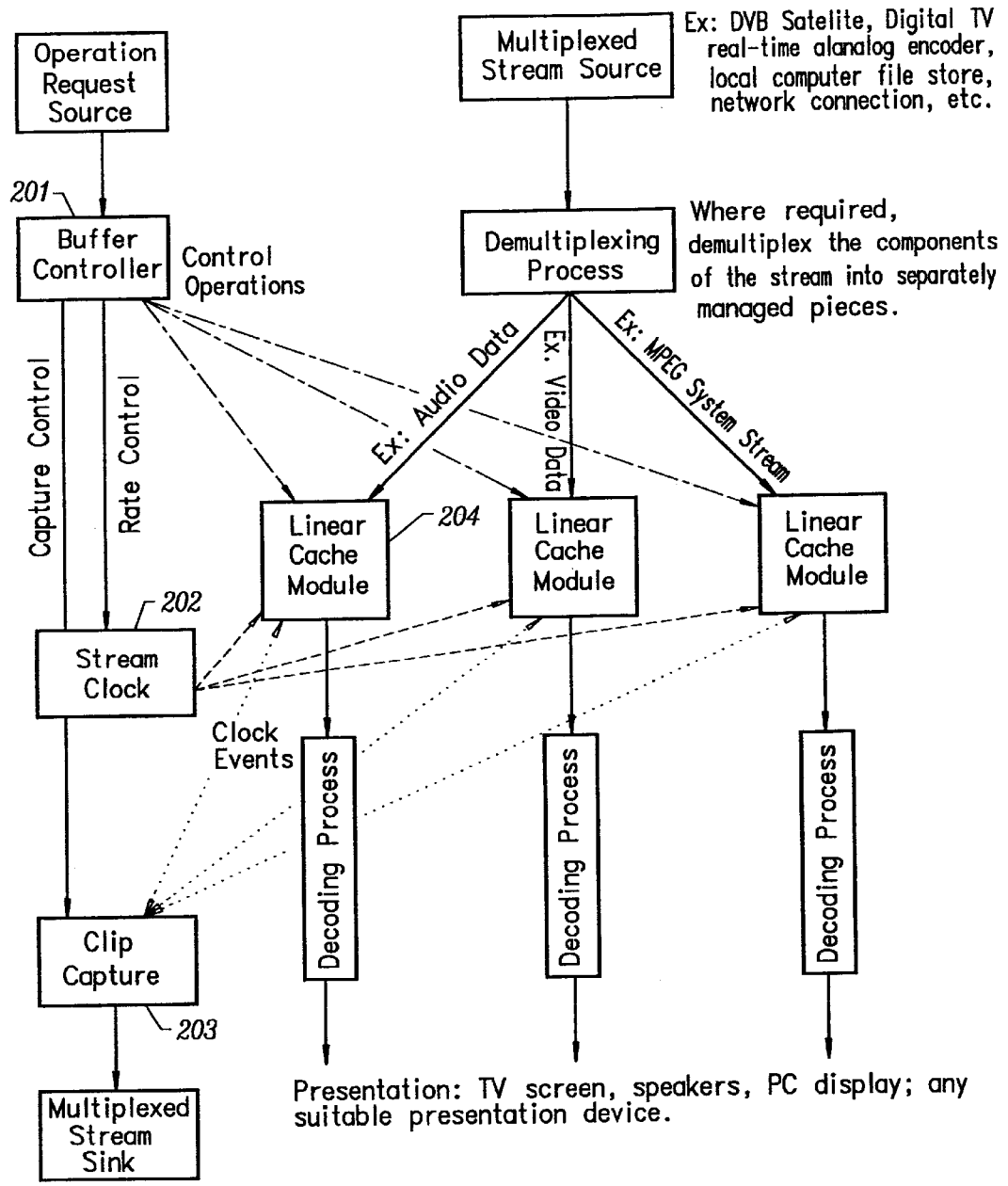
FIG. 2 is a block schematic diagram of a system incorporating a continuous media buffer according to the invention.

FIG. 2 illustrates the preferred embodiment of this invention. While the example in FIG. 2 is provided in connection with an MPEG stream of information, it should be appreciated that the invention is readily applied to any digital stream of information.

Manipulation and transformation of a data stream is performed in the invention by a combination of the following elements:

1. The Buffer Controller (201) is the main management device. It accepts external requests (generated, for instance, from a remote control device) for operations on the digital stream and, in turn, generates appropriate control messages for the other devices of the invention;
2. The Stream Clock (202) provides a general device for synchronizing operations on a set of linear caches, such that multiple streams of data which must be presented in a synchronized fashion are correctly positioned, and that they present their data at consistent delivery rates;
3. The Linear Cache (204) is a general device for buffering the information contained in a stream of digital information, such that the data in the cache can be viewed as a snapshot of the continuous stream of digital data; and
4. The Clip Capture (203) device is a general mechanism for capturing all or part of a cached set of information streams and presenting the resulting data as an organized stream of data to a data sink such as, for example, a computer file system or another display device.

The following sections describe each of the foregoing components, and how they interact, in detail.

Buffer Controller

The Buffer Controller (BC) module is responsible for instantiating the methods that provide for operation of the invention for any particular stream of data. The preferred embodiment of the invention includes one Stream Clock (SC) module, zero or more Clip Capture (CC) modules, and one or more Linear Cache (LC) stream modules. Operation of the invention preferably relies on designating one of the LC streams as the key stream. All positioning of playback from the LCs is based on first positioning the key stream, and then using the final position of that stream to position all other streams properly. For example, if the key stream is an MPEG video stream, then positioning is based on aligning the current block pointer to the beginning of an MPEG Group Of Pictures (GOP). Once the key stream is positioned, the BC repositions all other streams to be synchronized with the key stream.

The BC is also responsible for controlling the clock rate of the Stream Clock, which operates as described below. The rate at which the SC delivers clock events to the Linear Caches is based on the rate specified by the BC. Thus, the BC can speed up or slow down the playback of the entire collection of streams by requesting the SC to adjust its clock rate.

Finally, the BC is responsible for initiating clip capture operations using the Clip Capture method.

Stream Clock

The Stream Clock provides a central synchronization facility that distributes time-based events to a number of LCs. Each stream of information in a broadcast program is encoded using different techniques, each technique having unique notions of, for example, block size, data format, and presentation time stamps for decoding. For instance, in the time it takes for a single MPEG video frame to be decoded and presented, there may be several MPEG audio frames to be decoded and presented. The Stream Clock distributes events to each LC at the proper rate for that LC.

The Stream Clock uses a single queue for managing events to be distributed using standard, prior art techniques that are familiar to those skilled in the art of building time-based software systems.

Operation of the Stream Clock is detailed below.

Events are not queued with an absolute time, but with the relative offset from the previously queued event. The first event in the queue is marked with a time which is the offset from the current time. The Stream Clock then requests that the underlying operating system invoke a call out when that amount of time has passed, e.g. the SC queues a timer event. When the call out is invoked, the SC dispatches the first clock event and then each succeeding event whose offset is zero, i.e. each event that is to occur at the same time as the previous event.

Each event in the queue is also marked with a time interval and the absolute time of the data stream that the next event should occur. After a queued event is dispatched, the absolute time of the next event is composed by adding the time interval to the previous absolute time. The difference between this time and the current absolute time determines the delay before this event should be repeated. The event is then added to the queue at the appropriate position for the event's next occurrence. This strategy insures that even if some delay occurs in dispatching the event, following events occur at the proper time. After all events with a offset of zero have been processed, the SC queues a new timer event at the offset to the first waiting event, after which the above process repeats.

The decoupling of the absolute clock value and the actual dispatching of clock events is critical in implementing some of the unique and novel aspects of the invention, e.g. the ability to control easily the rate at which playback of the stream occurs. When initially created, the SC records a value referred to as the rate multiplier, which is initially set to one. Whenever the SC requests the underlying operating system to queue a timer event, the actual time delay requested is multiplied by the rate multiplier. A rate multiplier greater than one results in faster playback of the stream, while a multiplier of less than one results in a slower playback of the stream.

For the LCs to position themselves properly (see below), the same rate multiplier must be used to modify the Presentation Time Stamp (PTS) stored in each block when calculating positioning. Thus, the SC makes a small set of functions available to the LC which perform comparisons and operations on PTS values, after properly synchronizing those values with the rate multiplier stored in the SC.

The combination of the Stream Clock, with independent event generation for each LC and the ability to modify logically the rate at which all events are dispatched using a single value provides a novel and unique application of common time-based software design techniques.

The Linear Cache

Figure 3:
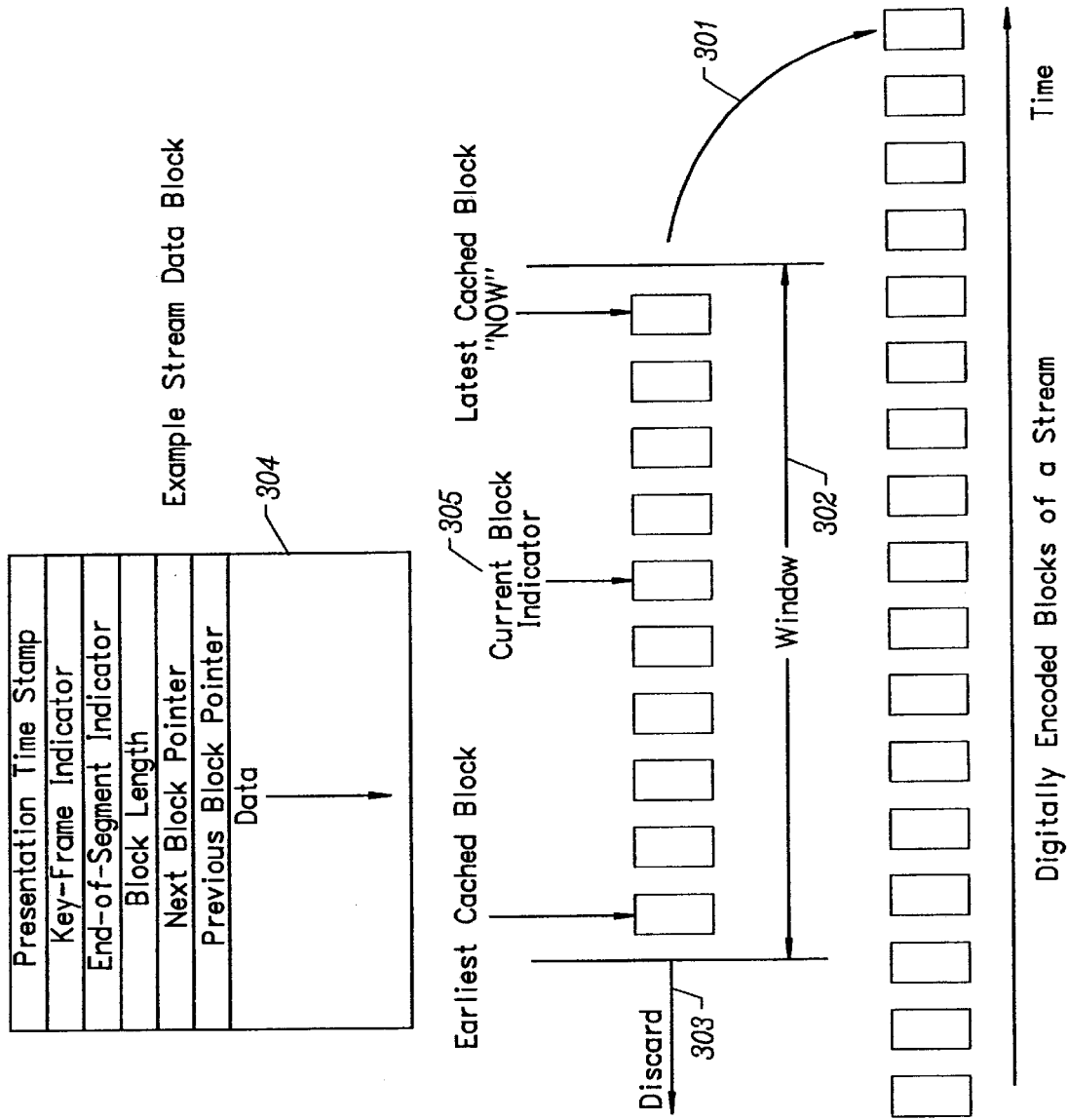
FIG. 3 is a timing diagram showing the operation of a linear cache according to the invention.

A key component of the invention is the Linear Cache (LC). The LC is used to store a single stream of digital information in proper sequence. The LC maintains this stream as a list of the digital blocks that make up the stream, and assumes that each block has a unique size and attributes. Each block within the stream is marked with a Presentation Time Stamp (PTS) which indicates when that block should be presented to the decoding process, be it hardware or software. The PTS is a monotonically increasing value initialized to zero when the LC first begins operation on a stream, and is not related to any time stamps defined by the underlying stream encoding technique except that once the LC begins operation, there is a constant offset between the PTS stored in the LC and any time stamps stored within the encoded digital blocks. It is assumed that the decoding process properly handles embedded time stamps. FIG. 3 gives a pictorial overview of the preferred embodiment of the Linear Cache.

The capture mechanism for a particular stream type gives each encoded digital block to the LC as it arrives (301). The LC marks that block with the current PTS for the stream. The LC maintains a window (302), which is defined as the maximum time, based on PTS values, between when the newest block in the LC arrived and the oldest block which the LC may hold. Thus, the window represents a time span into the past history of the stream. The LC discards blocks which fall outside the window (303), thus the window allows one to look a fixed distance into the past history of a stream. This mechanism allows choices and tradeoffs between available storage space and the availability of past information for viewing.

The capture mechanism is responsible for providing certain attributes along with each new block (304). The first of these is the key frame attribute, which indicates that this block begins a sequence of interrelated blocks. When performing random access operations on a stream, the LC only allows positioning of the stream to a block marked as a key frame. The second is the End Of Segment (EOS) attribute, which indicates that the stream has ended, and no more data are to be presented. For example, the I-frame of an MPEG GOP is marked as a key frame by the capture mechanism, but all other blocks are not so marked.

The LC maintains an indication of the next block to be presented to the decoding process, which is referred to as the current block indicator (305). For normal viewing, this block is the block last added to the LC by the capture mechanism. Thus, the stream is presented live, with at most a one-frame time delay between capture and presentation.

Random access to the information stream is achieved by moving the current block indicator to some other block in the LC. If the LC is requested to move the indicator, and the current block indicated is not a key frame, the LC instructs the decoding process to reset its decoding state, thus purging any partially constructed presentation data. For example, if the current frame is an MPEG predictive frame (P-frame), then the decoding process has state information, including the current picture to be modified by the P-frame. This data must be purged so that the decoder begins in the proper state.

Referring again to FIG. 2, the BC requests repositioning of an LC by specifying a PTS value. The LC finds the block containing a PTS which is closest to that requested by the BC. There are two unique cases for repositioning: the first, if the LC is marked as the key stream, and the second when it is not.

If the LC is marked as a key stream, the LC scans the blocks in the cache to find the key frame which is nearest to the requested PTS value, searching both before and after the desired value. Once properly positioned, the LC returns to the BC the PTS of the key frame block which was identified.

Following positioning of the key stream, the BC instructs each remaining stream to position itself to the PTS returned by the key-stream. Key frames in other LCs may not align with those in the key stream. Each LC handles this problem by requesting the decoding process to purge any decoding state, and then stores an indication that suppresses the LC from actually presenting blocks to the decoding process.

Following this, the LC behaves normally, accepting clock events and advancing the current block indicator to match, except that the blocks are not actually presented to the decoding process. When the LC encounters a key frame, it deletes the indication suppressing presentation of blocks, and presents the current block to the decoding process. This brings the stream into full synchronization with the key stream.

The following subsections describe in detail how positioning operations are handled by the LC.

Forward

The forward function is implemented by moving the current block indicator forward through the cache by one block for each event generated by the Stream Clock. Each successive block in the cache is given to the decoding process for presentation as clock events are dispatched by the SC. A rate multiplier of one causes the current block indicator to move forward one block in the LC at the same rate as new blocks are added to the LC by the capture process. Conceptually, the current block indicator points to the same position in the cache, while the window of cached blocks moves beneath it. From the perspective of the consumer of a stream, this results in play out at a fixed delay from real time.

There exists a rate at which the decoding process may not be able to present a block to the consumer before decoding of the next block must begin, i.e. the decoder can not keep up with the playback rate requested. The LC recognizes this case, and reverts to a key frame based method, where intermediate blocks are skipped and only key frames are presented to the decoder.

The current block indicator can not be positioned to an uncached block. If the rate multiplier indicates a rate greater than one, then the current block indicator eventually moves to the front of the cache. In this case, the key frame LC indicates to the BC that no more blocks are present in the cache. The BC resets the SC rate multiplier to one, and each LC positions the current block indicator to the latest cached block. The effect of this operation is to revert to undelayed play out of the actual information stream.

Reverse

The reverse function is implemented by moving the current block indicator backwards through the cache by one block for each clock event generated by the SC. Again, the key stream LC is used to control positioning. The BC instructs each LC to move to reverse mode, in which the current block indicator is moved backwards one block on each clock event. In addition, this mode causes the LC to suppress presentation of all but key frames to the decoding process. When the current block indicator is moved over a key frame, the block is presented to the decoding process.

The rate at which blocks are presented to the decoding process is controlled by the rate multiplier in the Stream Clock, allowing for arbitrary speed of reverse operation.

The current block indicator can not be moved past the oldest block in the cache. If a clock event would result in moving the current block indicator past the earliest block, then the indicator is set to that block, and play out continues as described above. The key frame LC indicates to the BC that the oldest cached block was reached. The BC resets the SC rate multiplier to one, and each LC positions the current block indicator to the oldest cached block. Externally, it appears as if the stream began playing in a forward direction again, time delayed by the window size.

Pause

The BC implements the pause function by locking the current block indicator in the key stream LC to that block. The LC can only lock the indicator to a key frame block, thus it searches forward for such a block in the cache. If no key frame is present, the LC stores an indication that a lock has been requested. When the capture process presents a key frame, the LC thus recognizes that the lock was requested, and locks the current block indicator to that key frame. The LC also presents this key frame to the decoding process, such that proper positioning, from the decoding process point of view, is maintained. Following this, as new blocks are added to the front of the cache, the block indicated moves backwards in the cache. Additionally, the LC sets the indicator suppressing further presentation of data to the decoding process.

For each non-key-stream LC, the BC simply suppresses further presentation of data blocks to the decoding process. The BC may be requested to release the pause (i.e. to play the stream). In this case, the BC obtains the PTS of the current block (as modified by the SC rate multiplier) from the key stream LC, and directs each remaining LC to position appropriately as described above. It then releases the lock on each LC, resulting in presentation of blocks to the decoding processes.

It is possible that the window moves past the block to which the indicator is locked because capture of the incoming stream is continuous. In this case, the indicator is unlocked and the left pointing at the earliest block in the cache. This gives the external effect of automatic release of the pause, similar to the behavior of a VCR, which releases the pause to avoid excessive wear on the tape and playback heads.

Get Clip

This function is used to extract a range of blocks from the cache. There are two modes in which it operates: relative mode and absolute mode.

As discussed above, the cached blocks appear as a linear list of blocks in presentation order. The getclip( ) function returns a pointer to a cached block, plus a count of the number of blocks that make up the range. This information is referred to as a clip. For efficiency sake, the pointer returned directly indicates a cached block, and the following blocks are retrieved by following the next block link in each cached block. This list is only valid if the first block pointed to and all succeeding blocks remain cached until the caller has completed its operation on the clip.

The LC has the following behavior to avoid invalidating blocks which are part of a clip: the getclip( ) function sets an indicator in the LC that suppresses discarding blocks which fall outside the window. This indicator is cleared when the releaseclip( ) function is called. The releaseclip( ) function also trims the cache to the window size.

The result of this sequence is that the number of blocks in the LC may temporarily increase. It is the responsibility of the caller of the getclip( ) function to operate on the clip as rapidly as possible because storage space for cached blocks is a limited resource. However, this strategy allows a clip to be captured without interfering with the ongoing playback of blocks from the LC, which avoids presenting the consumer of the blocks with any artifacts of the capture operation.

In relative mode, the clip to be captured is specified as two numbers, the first representing an offset from the current block indicator into previous blocks in the cache, and the second representing an offset from the current block indicator into subsequent blocks in the cache. The offset in both cases is expressed as a time differential from the PTS stored in the current block. For instance, a capture operation might occur from five seconds before the current block to ten seconds after the current block. No uncached blocks may be indicated by the getclip( ) operation. Thus, the LC trims the actual clip returned to match the blocks available in the cache.

In absolute mode, the clip to be captured is specified as two numbers, the first representing an absolute time stamp based on when the LC began operation, and the second representing a time offset from that value, which may be a negative offset (indicating a distance backwards in the cache) or a positive value (indicating distance forwards in the cache). The clip is returned as described above, and trimmed as necessary. This also implies that getclip( ) can return an empty list of blocks if no block in the cache is within the time window described.

Clip Capture

The Clip Capture module is responsible for selecting ranges of blocks from a set of LCs, bringing them together into an appropriate storage or transmission format, and saving or sending them as needed. This collection of blocks from multiple LCs is also referred to as a clip. The Clip Capture operation is invoked by the BC on external request.

There are two ways in which this request may be made:

First, the BC may indicate that capture should occur based on the current block indicator in the key stream LC, which is referred to as a relative capture, in which case a relative range of capture is specified.

Second, the BC may indicate an absolute range, in which case only blocks marked with a PTS inclusive in that range are captured. This is referred to as an absolute capture.

The operation of the Clip Capture module is straightforward. For each LC, the CC module calls the getclip( ) function of that LC with parameters as directed by the BC. The Clip Capture module then linearizes the blocks into a multiplexed stream appropriate for the final clip format desired. For example, it might generate an MPEG System Stream, interleaving blocks from the various LCs as needed.

This interleaving is conceptually simple. The CC loops through each clip obtained from an LC, choosing the block with the earliest PTS from among all clips, outputting the block as appropriate, and advancing the block pointer for that clip to the next block. When all the blocks from all clips are exhausted, the capture operation is complete. The CC then loops through all LCs calling the releaseclip( ) function.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for capturing and storing a video signal, comprising the steps of:

providing a plurality of linear caches for storing said video signal as digital blocks;

providing signal capture means for capturing said video signal and separating multiplexed components of said video signal before storing said components into separate linear caches;

providing cache playback means for selecting a portion of said linear caches for streaming access;

providing cache control means for controlling a rate of streaming access from said linear caches;

synchronizing streaming digital blocks from said linear caches for delivery to said cache playback means;

wherein said cache control means sends clock events to said cache playback means to control a rate and direction of streaming access;

wherein said synchronization step synchronizes the streaming digital blocks from said linear caches such that the streaming digital blocks are correctly positioned relative to each other;

wherein said linear caches maintain a window that represents a time span into a past history of said video signal that includes a currently captured portion of said video signal; and wherein said linear caches discard any information that outside of said window.

2. The process of claim 1, wherein said synchronization means designates a linear cache as a key stream and synchronizes the additional linear caches to said key stream.

3. The process of claim 1, further comprising the step of:

providing presentation means for presenting the streamed digital blocks from said cache playback means to a display device; and wherein said presentation means decodes the streamed digital blocks before presentation to said display device.

4. The process of claim 3, wherein each digital block is marked with a time stamp that indicates when that block should be presented to said presentation means.

5. The process of claim 1, wherein said cache playback means provides random access to said linear caches.

6. The process of claim 1, wherein said cache playback means provides functions including any of: pause, rewind, fast forward, play, play faster, play slower, skip/jump, replay, repeat, and play in reverse.

7. The process of claim 1, further comprising the step of:

providing clip capture means for capturing a range of information from said linear caches.

8. The process of claim 7, wherein said clip capture means saves said range of information to a storage device.

9. The process of claim 7, wherein said clip capture means decodes and displays said range of information on a display device.

10. The process of claim 7, wherein said clip capture means converts said range of information into an appropriate format for transmission.

11. The process of claim 2, wherein said cache playback means implements a forward function by moving a current block indicator forwards through said key stream.

12. The process of claim 11, wherein said cache access means moves said current block indicator by one block for each clock event.

13. The process of claim 11, wherein said cache playback means skips intermediate blocks in said key stream and selects only key frames if the clock event rate is high.

14. The process of claim 2, wherein said cache playback means implements a reverse function by moving a current block indicator backwards through said key stream.

15. The process of claim 14, wherein said cache access means moves said current block indicator by one block for each clock event.

16. The process of claim 14, wherein said cache playback means reverts to moving said current block indicator forward through said key stream if said current block indicator cannot be moved past the oldest block in said key stream.

17. The process of claim 2, wherein said cache playback means implements a pause function by locking a current block indicator to one block in said key stream.

18. The process of claim 17, wherein said cache playback means reverts to moving said current block indicator forward through said key stream if a clock event results in moving said current block indicator past the earliest block in said key stream.

19. A process for capturing and storing a video signal, comprising the steps of:

providing a plurality of linear caches for storing said video signal as digital blocks;

providing signal capture means for capturing said video signal and separating multiplexed components of said video signal before storing said components into separate linear caches;

providing cache playback means for selecting a portion of said linear caches for playback;

providing cache control means for controlling a rate of playback from said linear caches;

providing data synchronization means for synchronizing selected digital blocks from said linear caches for delivery to said cache playback means;

wherein said data synchronization means synchronizes said selected digital blocks from said linear caches such that said selected digital blocks are correctly positioned relative to each other;

wherein said linear caches maintain a window that represents a time span into a past history of said video signal that includes a currently captured portion of said video signal; and wherein said linear caches discard any information that falls outside of said window.

20. The process of claim 19, wherein said cache control means sends clock events to said cache playback means to control a rate and direction of playback.

21. The process of claim 19, wherein said synchronization means designates a linear cache as a key stream and synchronizes the additional linear caches to said key stream.

22. The process of claim 19, further comprising the step of:

providing presentation means for presenting said selected digital blocks from said cache playback means to a display device; and wherein said presentation means decodes said selected digital blocks before presentation to said display device.

23. The process of claim 22, wherein each digital block is marked with a time stamp that indicates when that block should be presented to said presentation means.

24. The process of claim 19, wherein said cache playback means provides random access to said linear caches.

25. The process of claim 19, wherein said cache playback means provides functions including any of: pause, rewind, fast forward, play, play faster, play slower, skip/jump, replay, repeat, and play in reverse.

26. The process of claim 19, further comprising the step of:

providing clip capture means for capturing a range of information from said linear caches.

27. The process of claim 26, wherein said clip capture means saves said range of information to a storage device.

28. The process of claim 26, wherein said clip capture means decodes and displays said range of information on a display device.

29. The process of claim 26, wherein said clip capture means converts said range of information into an appropriate format for transmission.

30. The process of claim 21, wherein said cache playback means implements a forward function by moving a current block indicator forwards through said key stream.

31. The process of claim 30, wherein said cache access means moves said current block indicator by one block for each clock event.

32. The process of claim 30, wherein said cache playback means skips intermediate blocks in said key stream and selects only key frames if the clock event rate is high.

33. The process of claim 21, wherein said cache playback means implements a reverse function by moving a current block indicator backwards through said key stream.

34. The process of claim 33, wherein said cache access means moves said current block indicator by one block for each clock event.

35. The process of claim 33, wherein said cache playback means reverts to moving said current block indicator forward through said key stream if said current block indicator cannot be moved past the oldest block in said key stream.

36. The process of claim 21, wherein said cache playback means implements a pause function by locking a current block indicator to one block in said key stream.

37. The process of claim 36, wherein said cache playback means reverts to moving said current block indicator forward through said key stream if a clock event results in moving said current block indicator past the earliest block in said key stream.

38. A process for capturing and storing a video signal, comprising the steps of:
   providing a plurality of linear caches for storing said video signal as digital blocks;
   providing signal capture means for capturing said video signal and separating multiplexed components of said video signal before storing said components into separate linear caches;
   providing cache playback means for selecting a portion of said linear caches for playback;
   providing cache control means for controlling a rate of playback from said linear caches; and
   wherein said linear caches maintain a window that represents a time span into a past history of said video signal that includes a currently captured portion of video signal; and
   wherein said linear caches discard any information that falls outside of said window.

39. The process of claim 38, further comprising the step of:
   providing data synchronization means for synchronizing selected digital blocks from said linear caches for delivery to said cache playback means; and
   wherein said data synchronization means synchronizes said selected digital blocks from said linear caches such that said selected digital blocks are correctly positioned relative to each other.

40. The process of claim 38, wherein said cache control means sends clock events to said cache playback means to control a rate and direction of playback.

41. The process of claim 38, wherein said synchronization means designates a linear cache as a key stream and synchronizes the additional linear caches to said key stream.

42. The process of claim 38, further comprising the step of:
   providing presentation means for presenting said selected digital blocks from said cache playback means to a display device; and
   wherein said presentation means decodes said selected digital blocks before presentation to said display device.

43. The process of claim 42, wherein each digital block is marked with a time stamp that indicates when that block should be presented to said presentation means.

44. The process of claim 38, wherein said cache playback means provides random access to said linear caches.

45. The process of claim 38, wherein said cache playback means provides functions including any of: pause, rewind, fast forward, play, play faster, play slower, skip/jump, replay, repeat, and play in reverse.

46. The process of claim 38, further comprising the step of:
   providing clip capture means for capturing a range of information from said linear caches.

47. The process of claim 46, wherein said clip capture means saves said range of information to a storage device.

48. The process of claim 46, wherein said clip capture means decodes and displays said range of information on a display device.

49. The process of claim 46, wherein said clip capture means converts said range of information into an appropriate format for transmission.

50. The process of claim 41, wherein said cache playback means implements a forward function by moving a current block indicator forwards through said key stream.

51. The process of claim 50, wherein said cache access means moves said current block indicator by one block for each clock event.

52. The process of claim 50, wherein said cache playback means skips intermediate blocks in said key stream and selects only key frames if the clock event rate is high.

53. The process of claim 41, wherein said cache playback means implements a reverse function by moving a current block indicator backwards through said key stream.

54. The process of claim 53, wherein said cache access means moves said current block indicator by one block for each clock event.

55. The process of claim 53, wherein said cache playback means reverts to moving said current block indicator forward through said key stream if said current block indicator cannot be moved past the oldest block in said key stream.

56. The process of claim 41, wherein said cache playback means implements a pause function by locking a current block indicator to one block in said key stream.

57. The process of claim 56, wherein said cache playback means reverts to moving said current block indicator forward through said key stream if a clock event results in moving said current block indicator past the earliest block in said key stream.

58. A process for capturing and storing a data stream, comprising the steps of:
   providing a linear cache for storing information from said data stream;
   providing cache access means for selecting a portion of the linear cache for streaming access to information stored therein;
   providing cache control means for controlling a rate of said streaming access to said linear cache;
   providing synchronization means for synchronizing streamed information from said linear cache for delivery to said cache access means;
   wherein said cache control means controls a rate and direction of said streaming access;
   wherein said linear cache maintains a window that represents a time span into a past history of said data stream that includes a most recently stored portion of said data stream; and
   wherein said linear cache discards any information that falls outside of said window.

59. The process of claim 58, wherein said cache control means sends clock events to said cache access means to control the rate and direction of said streaming access.

60. The process of claim 58, further comprising the step of:
   providing stream capture means for capturing information for a particular data stream type and encoding said information before storing said information in said linear cache.

61. The process of claim 58, wherein said linear cache stores said information as a list of digital blocks.

62. The process of claim 58, further comprising the step of:
providing presentation means for presenting the streamed information from said cache access means to a display device.

63. The process of claim 62, wherein said presentation means decodes the streamed information before presentation to said display device.

64. The process of claim 58, further comprising the step of:
providing presentation means for presenting the streaming access from said cache access means to a storage device.

65. The process of claim 58, wherein said cache playback means provides random access to said linear cache.

66. The process of claim 58, wherein said cache playback means provides functions including any of: pause, rewind, fast forward, play, play faster, play slower, skip/jump, replay, repeat, and play in reverse.

67. The process of claim 58, further comprising the step of:
providing clip capture means for capturing a range of information from said linear cache.

68. The process of claim 67, wherein said clip capture means saves said range of information to a storage device.

69. The process of claim 67, wherein said clip capture means converts said range of information into an appropriate format for transmission.

70. The process of claim 58, wherein said cache access means implements a forward function by moving a current block indicator forwards through said cache.

71. The process of claim 70, wherein said cache access means moves said current block indicator by one block for each clock event.

72. The process of claim 70, wherein said cache access means skips intermediate blocks in said linear cache, selecting only key frames if the clock event rate is high.

73. The process of claim 58, wherein said cache access means implements a reverse function by moving a current block indicator backwards through said cache.

74. The process of claim 73, wherein said cache access means moves said current block indicator by one block for each clock event.

75. The process of claim 73, wherein said cache access means reverts to moving said current block indicator forward through said cache if said current block indicator cannot be moved past the oldest block in said linear cache.

76. The process of claim 58, wherein said cache access means implements a pause function by locking a current block indicator to one block in said linear cache.

77. The process of claim 76, wherein said cache access means reverts to moving said current block indicator forward through said cache if said current block indicator is moved past the earliest block in said linear cache.

78. A process for capturing and storing a data stream, comprising the steps of:
providing a linear cache for storing information from said data stream;
providing cache access means for selecting a portion of the linear cache for streaming access to information stored therein;
providing cache control means for controlling a rate of said streaming access to said linear cache;
providing synchronization means for synchronizing streamed information from said linear cache for delivery to said cache access means;
wherein said cache control means sends clock events to said cache access means to control a rate and direction of said streaming access; and
wherein said linear cache maintains a window that represents a time span into a past history of said data stream that includes a most recently stored portion of said data stream; and
wherein said linear cache discard any information that falls outside of said window.

79. The process of claim 78, further comprising the step of:
providing stream capture means for capturing information for a particular data stream type and encoding said information before storing said information in said linear cache.

80. The process of claim 78, wherein said linear cache stores said information as a list of digital blocks.

81. The process of claim 78, further comprising the step of:
providing presentation means for presenting the streamed information from said cache access means to a display device.

82. The process of claim 81, wherein said presentation means decodes the streamed information before presentation to said display device.

83. The process of claim 78, further comprising the step of:
providing presentation means for presenting the streaming access from said cache access means to a storage device.

84. The process of claim 78, wherein said cache playback means provides random access to said linear cache.

85. The process of claim 78, wherein said cache playback means provides functions including any of: pause, rewind, fast forward, play, play faster, play slower, skip/jump, replay, repeat, and play in reverse.

86. The process of claim 78, further comprising the step of:
providing clip capture means for capturing a range of information from said linear cache.

87. The process of claim 86, wherein said clip capture means saves said range of information to a storage device.

88. The process of claim 86, wherein said clip capture means converts said range of information into an appropriate format for transmission.

89. The process of claim 78, wherein said cache access means implements a forward function by moving a current block indicator forwards through said cache.

90. The process of claim 89, wherein said cache access means moves said current block indicator by one block for each clock event.

91. The process of claim 89, wherein said cache access means skips intermediate blocks in said linear cache, selecting only key frames if the clock event rate is high.

92. The process of claim 78, wherein said cache access means implements a reverse function by moving a current block indicator backwards through said cache.

93. The process of claim 92, wherein said cache access means moves said current block indicator by one block for each clock event.

94. The process of claim 92, wherein said cache access means reverts to moving said current block indicator forward through said cache if said current block indicator cannot be moved past the oldest block in said linear cache.

95. The process of claim 78, wherein said cache access means implements a pause function by locking a current block indicator to one block in said linear cache.

96. The process of claim 95, wherein said cache access means reverts to moving said current block indicator forward through said cache if a clock event results in moving said current block indicator past the earliest block in said linear cache.

97. A process for processing data streams, comprising the steps of:

providing a plurality of linear caches for storing information from said data streams as digital blocks;

providing cache access means for selecting a portion of said linear caches for streaming access;

providing cache control means for controlling a rate of streaming access from said linear caches;

providing synchronization means for synchronizing streaming digital blocks from said linear caches for delivery to said cache playback means;

wherein said cache control means sends clock events to said cache playback means to control a rate and direction of streaming access;

wherein said synchronization means synchronizes the streaming digital blocks from said linear caches such that the streaming digital blocks are correctly positioned relative to each other;

wherein said linear caches maintain a window that represents a time span into a past history of said transport data streams that includes a most recently stored portion of said transport data streams; and wherein said linear caches discard any information that falls outside of said window.

98. The process of claim 97, further comprising the step of:

providing stream capture means for capturing the information for a particular data stream type.

99. The process of claim 97, further comprising the step of:

encoding said information before storing said information in a linear cache.

100. The process of claim 97, wherein said synchronization means designates a linear cache as a key stream and synchronizes additional linear caches to said key stream.

101. The process of claim 97, further comprising the step of:

providing presentation means for presenting the streamed digital blocks from said cache access means to a display device.

102. The process of claim 101, wherein each digital block is marked with a time stamp that indicates when that block should be presented to said presentation means.

103. The process of claim 101, wherein said presentation means decodes the streamed digital blocks before presentation to said display device.

104. The process of claim 97, further comprising the step of:

providing presentation means for presenting the streaming access from said cache access means to a storage device.

105. The process of claim 104, wherein each digital block is marked with a time stamp that indicates when that block should be presented to said presentation means.

106. The process of claim 97, wherein said cache access means provides random access to said linear caches.

107. The process of claim 97, wherein said cache access means provides functions including any of: pause, rewind, fast forward, play, play faster, play slower, skip/jump, replay, repeat, and play in reverse.

108. The process of claim 97, further comprising the step of:

providing clip capture means for capturing a range of information from said linear caches.

109. The process of claim 108, wherein said clip capture means saves said range of information to a storage device.

110. The process of claim 108, wherein said clip capture means converts said range of information into a selected transmission format.

111. The process of claim 100, wherein said cache access means implements a forward function by moving a current block indicator forwards through said key stream.

112. The process of claim 111, wherein said cache access means moves said current block indicator by one block for each clock event.

113. The process of claim 111, wherein said cache access means skips intermediate blocks in said key stream and selects only key frames if the clock event rate is high.

114. The process of claim 100, wherein said cache access means implements a reverse function by moving a current block indicator backwards through said key stream.

115. The process of claim 114, wherein said cache access means moves said current block indicator by one block for each clock event.

116. The process of claim 114, wherein said cache playback means reverts to moving said current block indicator forward through said key stream if said current block indicator cannot be moved past the oldest block in said key stream.

117. The process of claim 100, wherein said cache playback means implements a pause function by locking a current block indicator to one block in said key stream.

118. The process of claim 117, wherein said cache playback means reverts to moving said current block indicator forward through said key stream if a clock event results in moving said current block indicator past the earliest block in said key stream.

119. A process for processing data streams, comprising the steps of:

providing a plurality of linear caches for storing information from said data streams as digital blocks;

providing cache access means for selecting a portion of said linear caches for streaming access;

providing cache control means for controlling a rate of streaming access from said linear caches;

wherein said cache control means controls a rate and direction of streaming access;

wherein said linear cache maintains a window that represents a time span into a past history of said data stream that includes a most recently stored portion of said data stream; and wherein said linear cache discard any information that falls outside of said window.

120. The process of claim 119, further comprising the step of:

providing synchronization means for synchronizing streaming digital blocks from said linear caches for delivery to said cache access means; and wherein said synchronization means synchronizes the streaming digital blocks from said linear caches such that the streaming digital blocks are correctly positioned relative to each other.

121. The process of claim 119, further comprising the step of:

providing stream capture means for capturing the information for a particular data stream type.

122. The process of claim 121, further comprising the step of:

provides encoding said information before storing said information in a linear cache.

123. The process of claim 119, wherein said synchronization means designates a linear cache as a key stream and synchronizes additional linear caches to said key stream.

124. The process of claim 119, further comprising the step of:

providing presentation means for presenting the streamed digital blocks from said cache access means to a display device.

125. The process of claim 124, wherein each digital block is marked with a time stamp that indicates when that block should be presented to said presentation means.

126. The process of claim 124, wherein said presentation means decodes the streamed digital blocks before presentation to said display device.

127. The process of claim 119, further comprising the step of:

providing presentation means for presenting the streaming access from said cache access means to a storage device.

128. The process of claim 127, wherein each digital block is marked with a time stamp that indicates when that block should be presented to said presentation means.

129. The process of claim 119, wherein said cache access means provides random access to said linear caches.

130. The process of claim 119, wherein said cache access means provides functions including any of: pause, rewind, fast forward, play, play faster, play slower, skip/jump, replay, repeat, and play in reverse.

131. The process of claim 119, further comprising the step of:

providing clip capture means for capturing a range of information from said linear caches.

132. The process of claim 131, wherein said clip capture means saves said range of information to a storage device.

133. The process of claim 131, wherein said clip capture means converts said range of information into a selected transmission format.

134. The process of claim 123, wherein said cache access means implements a forward function by moving a current block indicator forwards through said key stream.

135. The process of claim 134, wherein said cache access means moves said current block indicator by one block for each clock event.

136. The process of claim 134, wherein said cache access means skips intermediate blocks in said key stream and selects only key frames if the clock event rate is high.

137. The process of claim 123, wherein said cache access means implements a reverse function by moving a current block indicator backwards through said key stream.

138. The process of claim 137, wherein said cache access means moves said current block indicator by one block for each clock event.

139. The process of claim 137, wherein said cache playback means reverts to moving said current block indicator forward through said key stream if said current block indicator cannot be moved past the oldest block in said key stream.

140. The process of claim 123, wherein said cache playback means implements a pause function by locking a current block indicator to one block in said key stream.

141. The process of claim 140, wherein said cache playback means reverts to moving said current block indicator forward through said key stream if a clock event results in moving said current block indicator past the earliest block in said key stream.

* * * * *

UNITED STATES PATENT AND TRADEMARK OFFICE
CERTIFICATE OF CORRECTION

| | | |
|---|---|---|
| PATENT NO. | : 6,792,195 B2 | Page 1 of 1 |
| APPLICATION NO. | : 09/994265 | |
| DATED | : September 14, 2004 | |
| INVENTOR(S) | : James M. Barton | |

It is certified that error appears in the above-identified patent and that said Letters Patent is hereby corrected as shown below:

On the Title Page
Item (73) Assignee: "Tivo,Inc., Alviso, CA (US)" should read --"TiVo Inc., Alviso, CA (US)"--

Column 11:
Claim 1, Line 4, "outside of said window." should read --"falls outside of said window."--

Signed and Sealed this

Twelfth Day of June, 2007

JON W. DUDAS
*Director of the United States Patent and Trademark Office*